United States Patent [19]
Shioya et al.

[11] Patent Number: 5,199,701
[45] Date of Patent: Apr. 6, 1993

[54] CARRIER APPARATUS USING ULTRASONIC ACTUATOR

[75] Inventors: Masaharu Shioya, Akikawa; Takahiro Mizushina, Tachikawa, both of Japan

[73] Assignee: Casio Computer Co., Ltd., Tokyo, Japan

[21] Appl. No.: 605,071

[22] Filed: Oct. 29, 1990

Related U.S. Application Data

[63] Continuation-in-part of Ser. No. 436,902, Nov. 15, 1989, abandoned.

[30] Foreign Application Priority Data

| Nov. 25, 1988 | [JP] | Japan | 63-297459 |
| Nov. 25, 1988 | [JP] | Japan | 63-297460 |
| Nov. 2, 1989 | [JP] | Japan | 1-286150 |
| Nov. 2, 1989 | [JP] | Japan | 1-286151 |

[51] Int. Cl.⁵ ............................ B65H 5/06
[52] U.S. Cl. ........................ 271/272; 271/119; 226/191
[58] Field of Search ............ 271/18.1, 18.2, 114, 271/119, 267, 193, 314, 272, 273, 118; 226/175, 191

[56] References Cited

U.S. PATENT DOCUMENTS

| 3,100,291 | 8/1963 | Abbott . |
| 3,211,931 | 10/1965 | Tehon . |
| 3,277,433 | 10/1966 | Toulis . |
| 3,902,084 | 8/1975 | May, Jr. . |
| 4,019,073 | 4/1977 | Vishnevsky et al. . |
| 4,100,527 | 7/1978 | Tocquet . |
| 4,151,437 | 4/1979 | Tocquet . |
| 4,180,839 | 12/1979 | Neff ....................... 226/175 X |
| 4,448,554 | 5/1984 | Driemeyer ............... 271/274 X |
| 4,462,093 | 7/2484 | Upton . |
| 4,754,441 | 6/1988 | Butler . |
| 4,868,446 | 9/1989 | Kumada . |
| 4,888,515 | 12/1989 | Tamura . |
| 5,000,364 | 3/1991 | Thimon .................... 226/175 |

FOREIGN PATENT DOCUMENTS

| 1613087 | 12/1967 | Fed. Rep. of Germany . |
| 60-156283 | 8/1985 | Japan . |
| 61-142979 | 6/1986 | Japan . |

*Primary Examiner*—Richard A. Schacher
*Attorney, Agent, or Firm*—Frishauf, Holtz, Goodman & Woodward

[57] ABSTRACT

This carrier apparatus employs an ultrasonic actuator comprising a piezoelectric actuator made of a piezoelectric element which extends and contracts in the radial direction of a cylindrical vibrator in the inner space of the cylindrical vibrator as a power source. This ultrasonic actuator elastically deforms the cross section of the peripheral wall of the cylindrical vibrator into an elliptical shape by the extension and contraction of the piezoelectric actuator, and transmits a driving force in a tangential direction to an article pressed on a predetermined position on the outer peripheral surface of the cylindrical body by utilizing the circumferential and radial transformations (or displacements) generated on the outer peripheral surface of the cylindrical vibrator upon elastic deformation of the elliptical shape.

20 Claims, 9 Drawing Sheets

CARRIER APPARATUS USING ULTRASONIC ACTUATOR

CROSS-REFERENCES TO THE RELATED APPLICATIONS

This application is a continuation-in-part of application Ser. No. 436,902, filed on Nov. 15, 1989, now abandoned.

BACKGROUND OF THE INVENTION

1. Field of the Invention

The present invention relates to a carrier apparatus using an ultrasonic actuator and, more particularly, to a carrier apparatus for carrying a printing sheet and the like by utilizing a predetermined motion generated by an ultrasonic actuator.

2. Description of the Related Art

Generally, a carrier apparatus used as a sheet carrying apparatus in printers employs a motor as its power source to carry an object to be carried as a printing sheet and the like by rotating a roller, etc., by the motor.

However, in the conventional carrier apparatus as described above, a power transmission mechanism using a gear, etc., must be provided between the roller and the motor. The power transmission mechanism increases a number of components in the carrier apparatus, resulting in an increase in the number of assembling steps of the carrier apparatus. The power transmission mechanism also becomes an obstruction for reduction in the carrier apparatus.

SUMMARY OF THE INVENTION

Accordingly, it is an object of the present invention to provide a carrier apparatus which can be readily reduced in size, in the number of components and the number of assembling steps.

In order to achieve the above-described object, there is provided a carrier apparatus comprising:

a cylindrical body;

changing means, capable of being extended and contracted, for elastically changing a circular cross section of said cylindrical body into an elliptical cross section;

control means for controlling the extension and contraction of said changing means so that the charging of the cross section of said cylindrical body to the elliptical shape is caused intermittently; and rotation means, located in contact with a predetermined position of the outer peripheral surface of said cylindrical body, for rotating in response to a transformation or displacement of the outer peripheral surface of said cylindrical body, which is caused by changing of the cross section of said cylindrical body to the elliptical shape;

whereby an object to be carried by the carrier apparatus is carried by rotation of said rotation means, or a carrier apparatus comprising:

a cylindrical body;

changing means, being extended and contracted, for elastically changing the cross section of said cylindrical body to an elliptical shape;

control means for controlling the extension and contraction of said changing means so that the transformation or displacement of the cylindrical body to the elliptical shape is caused intermittently; and auxiliary means for pressing an object to be moved on the outer peripheral surface of said cylindrical body;

whereby the object is moved in response to a transformation or displacement of the outer peripheral surface of said cylindrical body, which is caused by changing of the cross section of said cylindrical body to the elliptical shape.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

Various embodiments and modified embodiments of the present invention will be described in detail with reference to the accompanying drawings.

DETAILED DESCRIPTION OF THE PREFERRED EMBODIMENTS

FIGS. 1 to 10 show a structure of a paper carrier apparatus of a first embodiment of the present invention, used in a printer.

Figure 1:
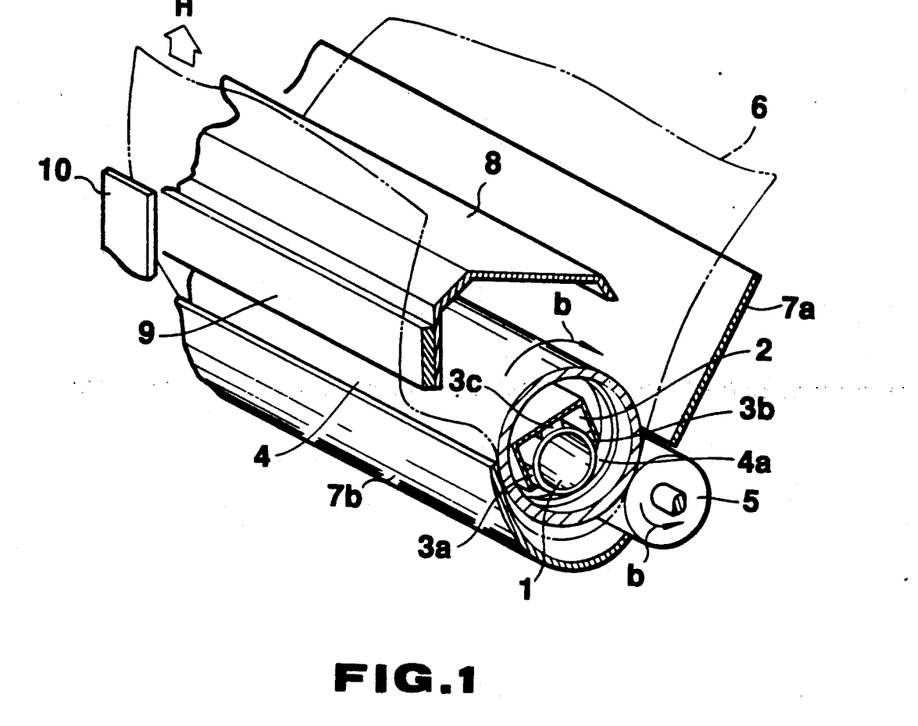
FIG. 1 is a perspective view schematically showing a paper carrier apparatus of a first embodiment of the present invention, used in a printer, a part of which being cut away.
Figure 2:
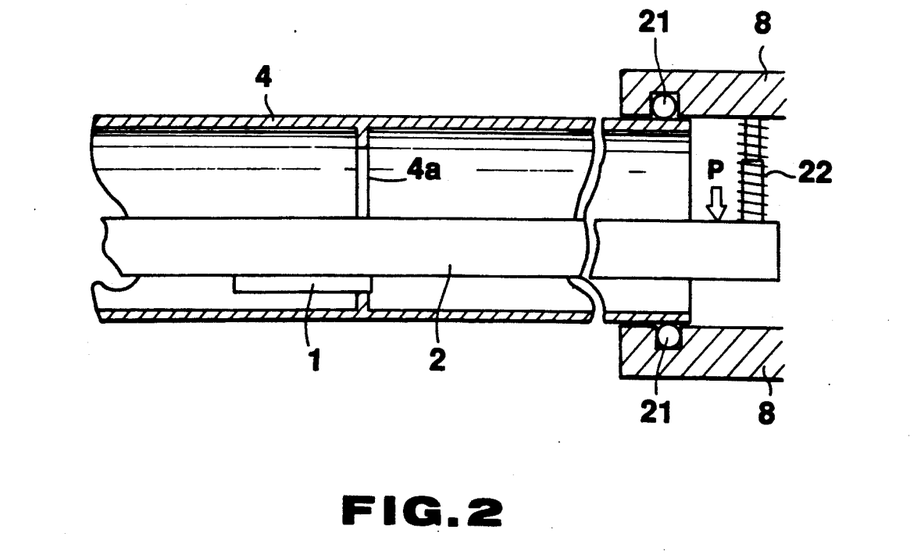
FIG. 2 is a longitudinal sectional view schematically showing a part of a structure in which an ultrasonic actuator and a sheet carry roller of the paper carrier apparatus of FIG. 1 are supported by a frame of the paper carrier apparatus.

As shown in FIGS. 1 and 2, a cylindrically shaped ultrasonic actuator 1 is employed as a rotation power source in the paper carrier apparatus. The ultrasonic actuator 1 is elastically deformed at a circular cross section of the outer peripheral wall thereof into a plurality of elliptical shapes at a constant periods determined in response to the frequency of a power source, and the deformations of a plurality of positions on the outer peripheral surface of the peripheral wall corresponding to the plurality of major axes of the ellipses are operated as a rotary power source.

The ultrasonic actuator 1 is disposed in a downwardly directed opening of a base 2 having a square inverted U-shaped cross section, and is supported on the inner surfaces of the upper, right, and left walls of the base 2 through elastic members 3a to 3c made of such as rubber.

The ultrasonic actuator 1 supported by the base 2 is disposed in an inner space of a hollow cylindrical shaped paper sheet carry roller 4, and a part of the outer peripheral surface of the actuator 1 protruding from the lower opening of the base 2 contacts a flange shaped protruding portion 4a formed on the inner peripheral surface of the paper sheet carry roller 4. The ultrasonic actuator 1 is fixed to a frame, to be described later, of a paper carrier apparatus through both ends of the base 2, and the paper sheet carry roller 4 is rotatably supported at both ends thereof by the frame. A paper sheet retainer roller 5 is contacted with the outer peripheral surface of the paper sheet carry roller 4, and a printing sheet introducting guide plate 7a extended in a direction to go far away from the paper sheet carry roller 4 and a printing sheet feeding guide plate 7b extended along the outer peripheral surface of the paper sheet carry roller 4 are disposed at both sides of the paper sheet retainer roller 5.

A part of a frame 8 of the paper carrier apparatus is disposed above the paper sheet carry roller 4, and the frame 8 supports a platen 9 extended in a longitudinal direction of the paper sheet carry roller 4. A printing head 10 movable in parallel with and along the platen 9 is mounted at a position opposed to the platen 9.

FIG. 2 shows a supporting structure of the ultrasonic actuator 1 and the paper sheet carry roller 4 of the paper carrier apparatus. The frame 8 of the apparatus rotatably supports both ends of the paper sheet carry roller 4 through ball bearings 21, and further supports both ends of the base 2 supporting the ultrasonic actuator 1 through springs 22 so that the lower opening of the base 2 is directed downwardly. In other words, the ultrasonic actuator 1 is pressed at the part of the outer peripheral surface thereof protruding from the lower opening of the base 2 on the protruding portion 4a of the inner peripheral surface of the paper sheet carry roller 4 by the elastic force of the springs 22 in a direction indicated by an arrow P.

When the ultrasonic actuator 1 is intermittently elastically deformed in a plurality of elliptical shapes in the carrier apparatus constructed as described above, the paper sheet carry roller 4 contacted with the part of the outer peripheral surface of the actuator 1 exposed from the lower opening of the base 2 is rotated in a direction of an arrow b indicated in FIG. 1, and the paper sheet retainer roller 5 is also rotated in the direction of the arrow b in FIG. 1. In other words, when a printing sheet 6 is guided along the printing sheet introducting guide 7a so as to be inserted between the paper sheet carry roller 4 and the paper sheet retainer roller 5, the printing sheet 6 is carried in a direction indicated by an arrow H by the paper sheet carry roller 4 and the paper sheet retainer roller 5, and is moved relatively to the printing head 10 on the platen 9 as shown in FIG. 1.

Figure 3A:
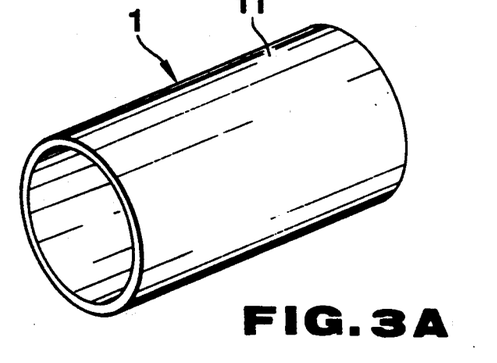
FIG. 3A is a schematic perspective view of the ultrasonic actuator of the paper carrier apparatus of FIG. 1.
Figure 3B:
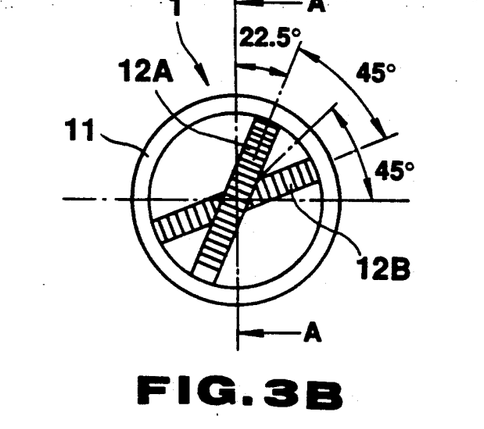
FIG. 3B is a schematic side view of the ultrasonic actuator of FIG. 3A.
Figure 3C:
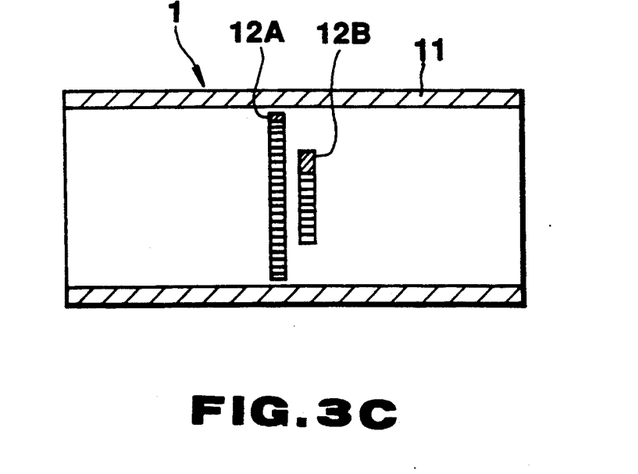
FIG. 3C is a schematic longitudinal sectional view of the ultrasonic actuator, taken along a line A—A of FIG. 3B.

FIGS. 3A to 3C show a structure of the ultrasonic actuator 1, wherein FIG. 3A is a perspective view of an external appearance of the actuator 1, FIG. 3B is a side view of the actuator 1, and FIG. 3C is a sectional view taken along a line A—A of FIG. 3B.

The outer shape of the ultrasonic actuator 1 is formed of a cylindrical vibration body o cylindrical vibrator 11 made of aluminum or brass having, for example, 10.35 mm of an outer diameter and 0.5 mm of a thickness. A pair of rod-shaped piezoelectric actuators 12A and 12B are provided in the vicinity of the longitudinal center of the inner space of the cylindrical vibration body 11 in a state that the longitudinal center lines of the actuators 12A and 12B are disposed in the radial direction of the cylindrical vibrator 11. The first piezoelectric actuator 12A is inclined at 22.5° with respect to a vertical direction, and the second piezoelectric actuator 12B is inclined at 45° from the first piezoelectric actuator 12A.

Figure 4:
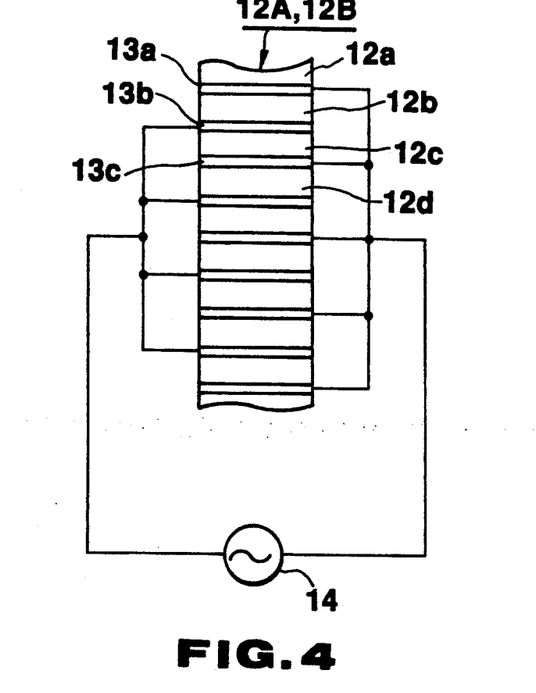
FIG. 4 is a plan view schematically showing a structure of a piezoelectric actuator used in the ultrasonic actuator of FIG. 3B.

FIG. 4 shows structures of the first and second piezoelectric actuators 12A and 12B. The first and second piezoelectric actuators 12A and 12B are respectively formed by laminating a number of ultrafine piezoelectric ceramics 12a, 12b, . . ., made of PZT (piezoelectric elements of zirconate-titanate series) with thin electrodes 13a, 13b, . . . , being interposed therebetween. Both ends of each of the first and second piezoelectric actuators 12A and 12B are bonded to the inner surface of the cylindrical vibrator 11 with relatively hard adhesive such as epoxy resin adhesive, etc., in a state that seat plates made of aluminum or brass are interposed therebetween. An AC voltage having a predetermined frequency is applied from a power source 14 to the electrodes 13a, 13b, ..., of the first and second piezoelectric actuators 12A and 12B such that a voltage of reverse phase is applied among adjacent piezoelectric ceramics 12a, 12b, ..., through the electrodes 13a, 13b, .... The AC voltage applied from the power source 14 to the second piezoelectric actuator 12B is deviated 180° out of phase from the AC voltage applied from the power source 14 to the first piezoelectric actuator 12A. The applied voltage in this embodiment is set to 8 Vmax, and the frequency of the applied voltage is set to 30 kHz in a case that the cylindrical vibrator 11 is made of aluminum, or set to 36 kHz in a case that the vibrator 11 is made of brass. However, these values are altered according to factors such as a driving torque to be obtained, a paper sheet carrying speed, and size of the outer diameter and thickness of the cylindrical wall of the vibrator 11.

The operation of the ultrasonic actuator 1 constructed as described above will be described.

When AC voltages having reverse phases to one another and, for example, 30 kHz are respectively applied to the first and second piezoelectric actuators 12A and 12B, longitudinal extension and contraction responsive to the frequency of the applied voltage are respectively generated in reverse phase at the first and second piezoelectric actuators 12A and 12B.

Figure 5:
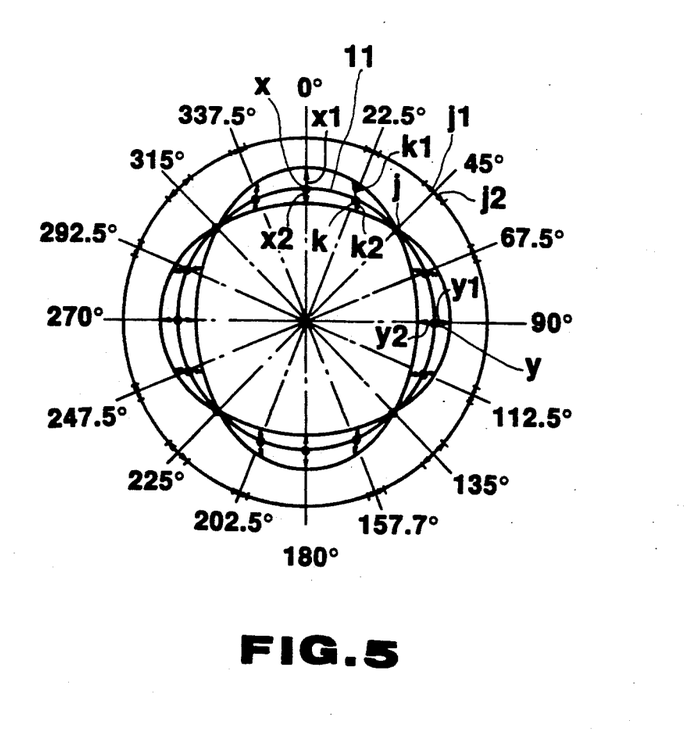
FIG. 5 is a view showing two elliptically shaped elastic deformation generated in the cross section of the peripheral wall of a cylindrical vibrator of the ultrasonic actuator of FIG. 3A.

FIG. 5 shows a transformation generated on the outer peripheral surface of the cylindrical vibrator 11 upon extension and contraction of the piezoelectric actuators 12A and 12B. In the following description, the upwardly extending portion of the vertical line passing the radial center of the cylindrical vibrator 11 is set to 0°, and the operation will be described by utilizing angles sequentially set in the clockwise direction around the center of the cylindrical vibrator 11 from the upwardly extending portion. In FIG. 5, both ends of the first and second piezoelectric actuators 12A and 12B are respectively disposed at angular positions of 22.5° and 202.5° and 67.5° and 247.5° with respect to the center of the cylindrical vibrator 11. The extension and contraction of reverse phase generated at the piezoelectric actuators 12A and 12B cause the cross section of the cylindrical vibrator 11 to be alternately elastically deformed to an elliptical shape in which its major axis is disposed in a vertical direction (0°–180° direction) and an elliptical shape in which its major axis is disposed in a horizontal direction (90°–270° direction).

More specifically, a motion, in which the angular position of 22.5° of the peripheral wall of the cylindrical vibrator 11 is extended outwardly and the angular position of 67.5° is contracted inwardly, and a motion, in which the angular position of 22.5° is contracted inwardly and the angular position of 67.5° is extended outwardly, are alternately continuously repeated. At this time, the angular position j of the peripheral wall of the cylindrical vibrator 11, corresponding to 45° of the angular position around the center and located between the two angular positions (22.5° and 67.5°) in which one ends of the two piezoelectric actuators 12A and 12B are respectively fixed to the inner surface of the cylindrical vibrator 11, becomes a boundary between the two elliptical elastic deformation of the circumferential wall generated by the above described two motions. Thus, when the first actuator 12A is extended, the portion of the peripheral wall of the cylindrical vibrator 11 laid from the angular position of 67.5° to the angular position of 22.5° becomes an upwardly inclined surface, and this inclined surface forms a part of an ellipse a maximum outward transformation x1 of which is disposed at the angular position of 0° of the peripheral wall. When the second actuator 12B is extended, the portion of the peripheral wall of the cylindrical vibrator 11 laid from the angular position of 22.5° to the angular position of 67.5° becomes an upwardly surface, and this inclined surface forms a part of another ellipse a maximum outward transformation y1 of which is disposed at the angular position of 90° of the peripheral wall. In this case, the angular positions of 45°, 135°, 225° and 315° of the peripheral wall of the cylindrical vibrator 11 are static points at which the elastic transformations of the two ellipses intersect and no radial transformation occur even in a process of the elastic transformations of the two ellipses.

When the points x corresponding to the angular positions of 0° and 180° on the outer peripheral surface of the peripheral wall are radially transformed to the maximum outward transformation x1 upon the elastic transformation of the elliptical shape described above, the material points j located at the angular positions of the static points of 45°, 135°, 225° and 315° are respectively deviated or transformed by j1. When the material points y corresponding to the angular positions of 90° and 270° on the outer peripheral surface of the peripheral wall are radially transformed to the maximum outward transformation y1 upon the elastic transformation of the elliptical shape described above, the material points j are transformed in the circumferentially opposed direction relative to the above described j1 transformation by j2. From these facts, two transformations k1 and k2 combined with radial and circumferential transformations generated at the material point k by the elastic deformations of the two elliptical shapes described above, occurs at the arbitrary material points k located (e.g., 22.5°, 67.5°, 112.5°, 157.5°, 202.5°, 247.5°, 292.5°, and 337.5°) between the points x and y (the angular positions of which are 0°, 90°, 180° and 270°) on the outer peripheral surface of the peripheral wall at which the radial transformation becomes maximum, and the positions j located (the angulas positions of which are 45°, 135°, 225° and 315°) on the outer peripheral surface of the peripheral wall at which the circumferential transformation becomes maximum. When the cylindrical roller is contacted with the material point k combined with the radial and circumferential transformations, the roller is rotated in a direction coincident with the circumferential transformation j1 generated when the material point k is transformed radially outwardly by k1.

Figure 6A:
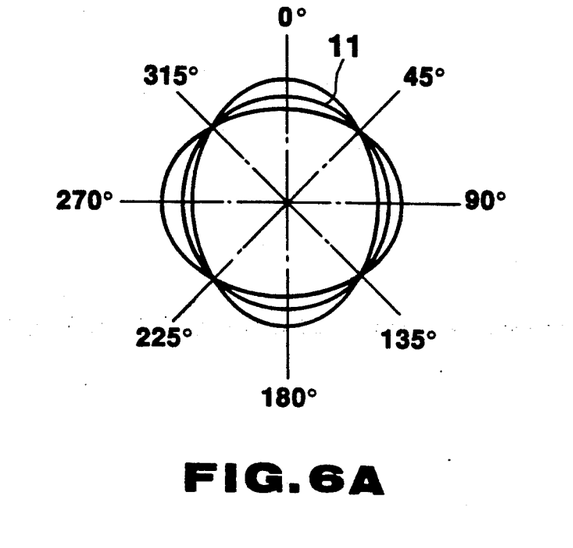
FIGS. 6A and 6B are views schematically showing the magnitude distributions of radial and circumferential transformations or displacements on the outer peripheral surface of the peripheral wall of the cylindrical vibrator, caused by the two elliptically shaped elastic deformations generated in the cross section of the peripheral wall of the cylindrical vibrator of the ultrasonic actuator of FIG. 3A.
Figure 6B:
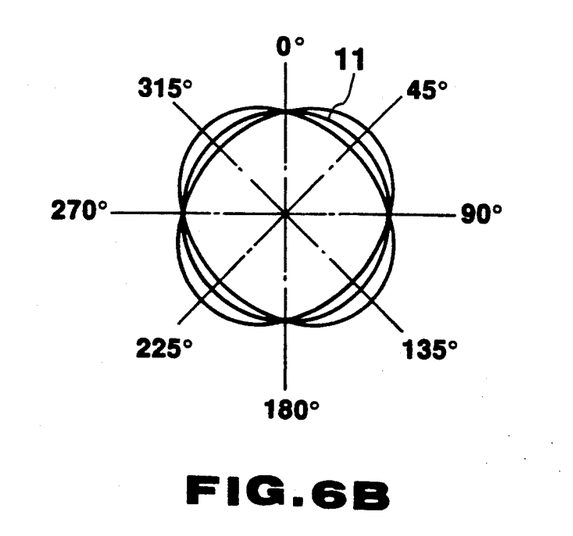

FIGS. 6A and 6B show magnitude distributions of radial and circumferential transformations of the outer peripheral surface of the peripheral wall upon the processes of the elastic deformations of the two elliptical shapes in the cross section of the peripheral wall of the cylindrical vibrator 11. As shown in FIG. 6A, the radial transformation becomes maximum at the angular positions of 0°, 90°, 180° and 270° in response to the process of the elastic deformations of the two elliptical shapes of the cylindrical vibrator 11, and becomes "0" at the angular positions of 45°, 135°, 225° and 315°. As shown in FIG. 6B, the circumferential transformation becomes maximum at the angular positions of 45°, 135°, 225° and 315° on the outer peripheral surface of the peripheral wall of the cylindrical vibrator 11, and becomes "0" at the angular positions of 0°, 90°, 180° and 270°.

More specifically, when AC voltages of reverse phase are respectively applied to the piezoelectric actuators 12A and 12B to alternately generate extension and contraction of high period at the two actuators 12A and 12B and hence when elastic deformation of the elliptical shape having a major axis in a vertical direction and elastic deformation of the elliptical shape having a major axis in a horizontal direction are alternately generated through a regularly circular state at the cross section of the peripheral wall of the cylindrical vibrator 11, combination transformations each of which is obtained by combining the transformations in the radial and circumferential directions occur at the portions on the outer peripheral surface of the peripheral wall of the cylindrical vibrator 11 between the angular positions of 0° and 45°, 45° and 90°, 90° and 135°, 135° and 180°, 180° and 225°, 225° and 270°, 270° and 315°, 315° and 0°, and the combination transformations are maximum at the intermediate positions in the respective portions.

Figure 7A:
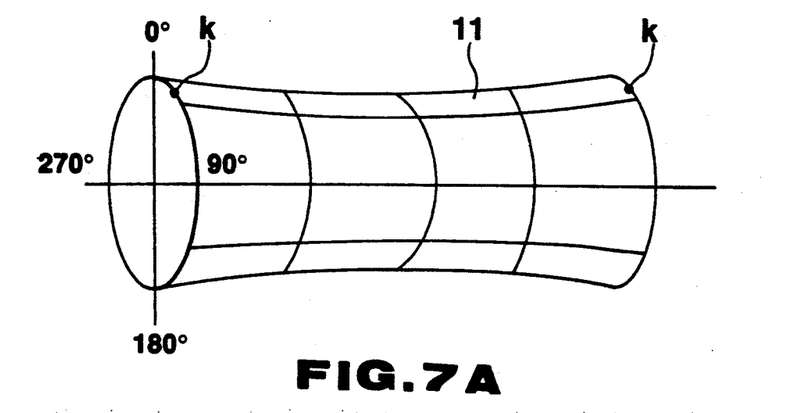
FIGS. 7A to 7C are enlarged views schematically showing the changes of the entire outer peripheral surface of the cylindrical vibrator, caused by the two elliptically shaped elastic deformations generated in the cross section of the peripheral wall of the cylindrical vibrator of the ultrasonic actuator shown in FIG. 3A.
Figure 7B:
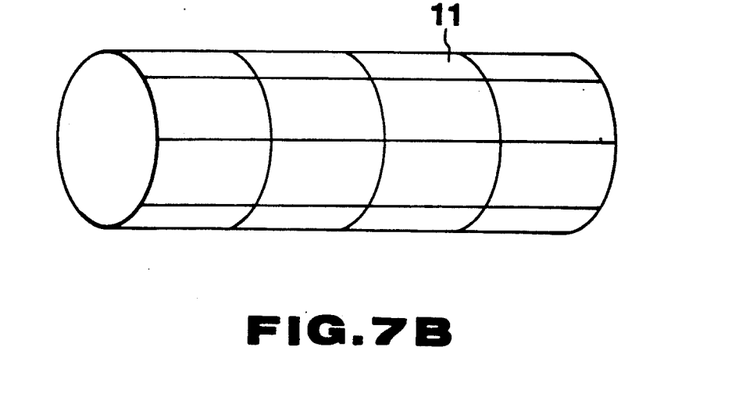
Figure 7C:
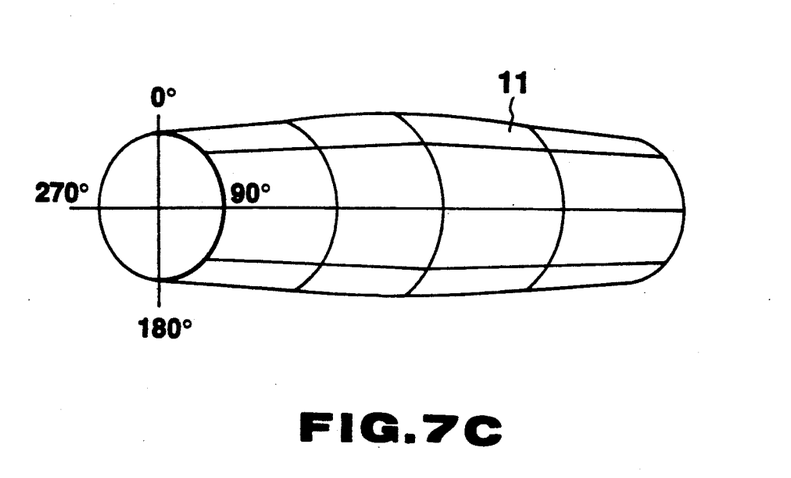

FIGS. 7A to 7C show in a large scale changes of the entire outer peripheral shape of the cylindrical vibrator 11 caused by the elastic deformations of the two elliptical shapes generated in the cross section of the peripheral wall of the cylindrical vibrator 11. It was understood from experiments that, when the piezoelectric actuators 12A and 12B are disposed substantially at the longitudinal center of the inner space of the cylindrical vibrator 11, the radial transformation of the outer peripheral surface of the peripheral wall of the cylindrical vibrator 11 in the vertical direction (0°–180° direction) and the horizontal direction (90°–270° direction) become larger at the positions nearer to the both ends of the cylindrical vibrator 11. In other words, maximum combination transformation at which the combination of the transformations in the radial and circumferential directions is maximum is obtained at the positions of the every angular positions of 45° from the material point k of the angular position of 22.5° on the outer peripheral surface of the both ends of the cylindrical vibrator 11.

Figure 8:
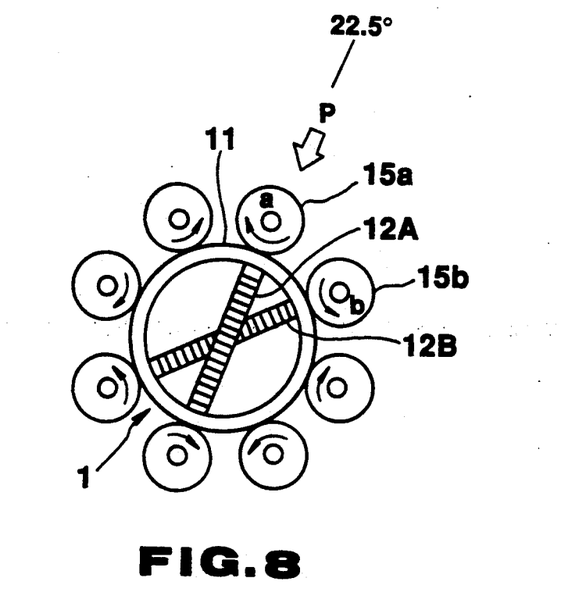
FIG. 8 is a side view schematically showing a structure for converting the movement of the ultrasonic actuator of FIG. 3A into a rotating motion of a rotor.

Therefore, as shown in FIG. 8, rollers 15a, 15b, . . . , are pressed, as indicated by an arrow P, at the every angular position of 45° from the angular position of 22.5° on the outer peripheral surface of the cylindrical vibrator 11, so that the rollers are rotated in a direction of an arrow a or b in response to the maximum combination transformation of the radial and circumferential directions at predetermined positions on the outer peripheral surface of the cylindrical vibrator 11, at which the rollers 15a, 15b, . . . are contacted with.

Figure 9:
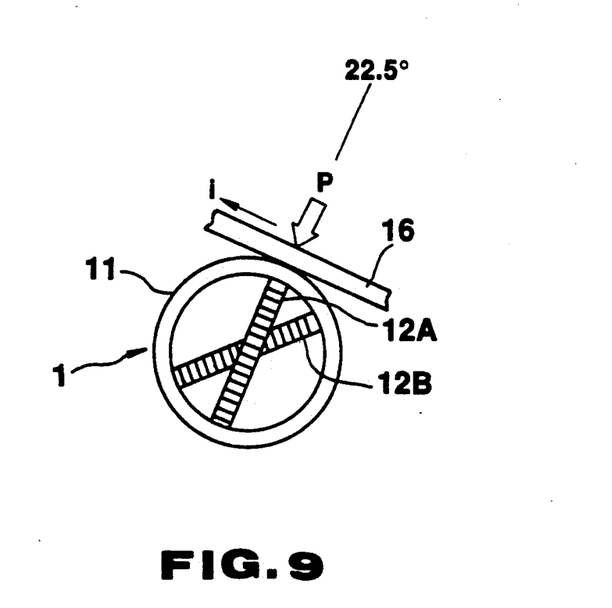
FIG. 9 is a side view schematically showing a structure for converting the movement of the ultrasonic actuator of FIG. 3A into a linear motion of a sheet-shaped moving object.

Thus, as shown in FIG. 9, when a sheet-shaped moving object 16 such as a printing sheet is pressed, as indicated by an arrow P, at any of a plurality of radial and circumferential maximum transformation points located at the every angular portions of 45° from the angular position of 22.5° on the outer peripheral surface of the cylindrical vibrator 11 in the ultrasonic vibrator 1, the moving object 16 is linearly moved, as shown by an arrow i, in the same direction as the circumferential transformation at the maximum transformation points.

Figure 10:
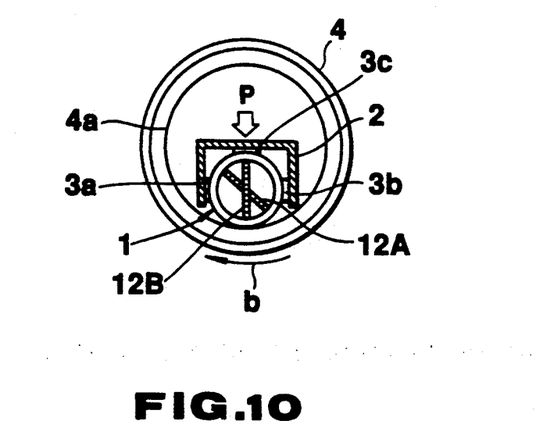
FIG. 10 is a side view schematically showing a rotating state of a sheet carry roller of the paper carrier apparatus of FIG. 1.

FIG. 10 shows the rotating state of the paper sheet carry roller 4 the power source of which is the ultrasonic actuator 1. The angular position of 22.5°+45° on the outer peripheral surface of the cylindrical vibrator 11 of the ultrasonic actuator 1 is pressed on the protruding portion 4a of the inner peripheral surface of the paper sheet carry roller 4 by the elastic force as shown by an arrow P, so that the paper sheet carry roller 4 rotates in the clockwise direction as indicated by an arrow b in accordance with the same principle as the rotating principle of the roller 15b in FIG. 8. Thus, the printing sheet 6 inserted between the paper sheet carry roller 4, rotating in a direction of the arrow b in FIG. 1, and the paper sheet retainer roller 5 is passed over the platen 9 as shown by an arrow H, and the printing head 10 prints on the printing sheet 6 moving on the platen 9.

Therefore, in the paper carrier apparatus constructed as described above, the ultrasonic actuator 1 composed of the cylindrical vibrator 11 and the piezoelectric actuators 12A and 12B is used as a rotation drive source of the paper sheet carry roller 4. Accordingly, the number of components and the number of assembling steps can be largely reduced as compared with the conventional rotation driving mechanism with a motor as a power source, thereby reducing in size the carrier apparatus such as the paper carrier apparatus used for a printer, etc.

In the embodiment described above, two piezoelectric actuators 12A and 12B are employed to generate the elastic deformations of the two elliptical shapes in the cross section of the peripheral wall of the cylindrical vibrator 11. However, the number of the piezoelectric actuators is not limited.

A second embodiment of the present invention will be described with reference to FIGS. 11 to 13.

In this second embodiment, the same components as those in the first embodiment are designated by the same reference numerals, and a detailed description thereof will be omitted.

Figure 11:
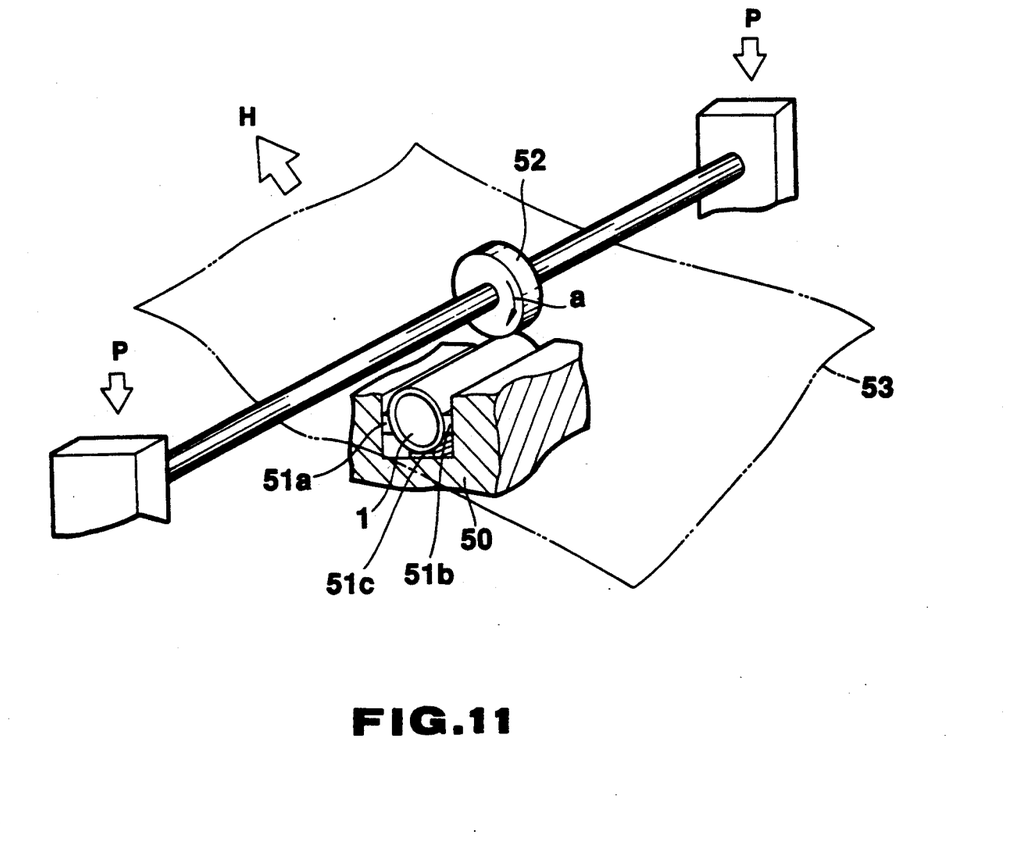
FIG. 11 is a perspective view schematically showing a paper carrier apparatus of a second embodiment of the present invention used in a printer, a part of which being cut away.

FIG. 11 schematically shows an external appearance of a carrier apparatus according to the second embodiment of the invention. An ultrasonic actuator 1 having the same construction as that used in the first embodiment is employed as a rotation drive source of the paper carrier apparatus.

In the ultrasonic actuator 1 of this embodiment, a cylindrical vibrator 11 is disposed in the inner space of a base 50 having a square U-shaped cross section, and the vibrator 11 is supported on the lower, right, and left inner surfaces of the inner space of the base 50 through elastic members 51a to 51c made of rubber, etc.

A maximum combination transformation point at which the combination of the transformations in the radial and circumferential directions of the outer peripheral surface of the cylindrical vibrator 11 is maximum protrudes from the upper opening of the base 20. A roller 52 is pressed on the maximum transformation point with a pressure P preset by a spring, etc.

When predetermined elastic deformations of cross section are generated intermittently at the cylindrical vibrator 11 of the ultrasonic actuator 1 as in the first embodiment described above, the roller 52 contacted with the maximum transformation point is rotated in a direction of an arrow a. In other words, when a printing sheet 53 is inserted between the cylindrical vibrator 11 of the ultrasonic actuator 1 and the roller 52, the printing sheet 53 is carried in a direction as indicated by an arrow H.

Figure 12:
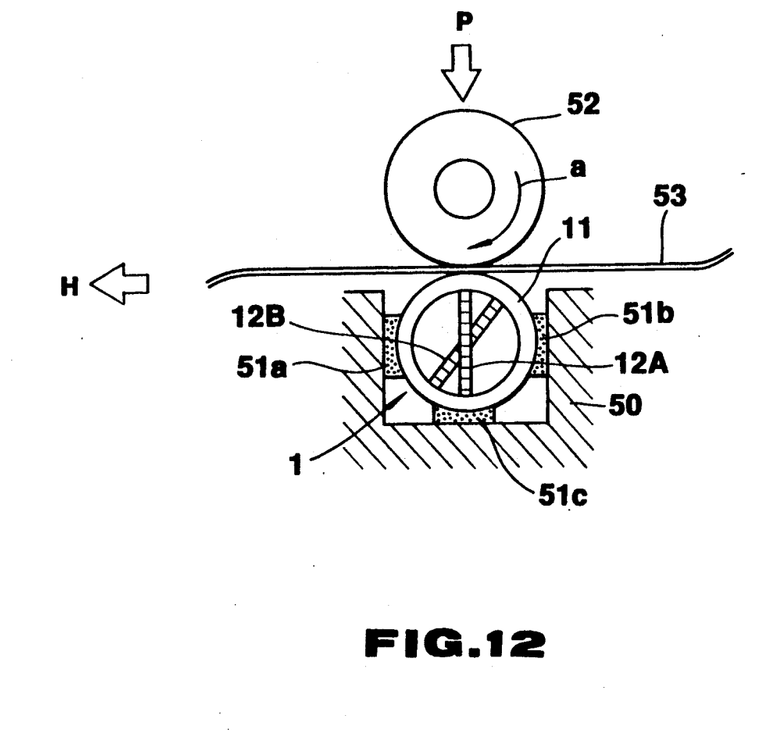
FIG. 12 is a side view schematically showing a carrying state of a sheet-shaped object by the paper carrier apparatus of FIG. 11, a part of which being cut away.
Figure 13:
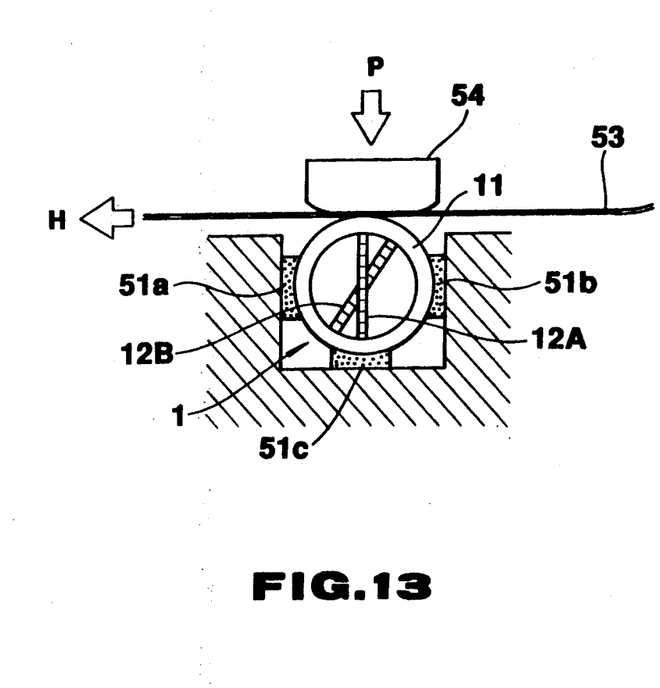
FIG. 13 is a side view schematically showing a modified embodiment of the paper carrier apparatus of FIG. 11, a part of which being cut away.

FIG. 12 shows a carrying state of a printing sheet 53 by a carrier apparatus according to the second embodiment described above. The printing sheet 53, inserted between the angular position of 22.5° (maximum combination point of the radial and circumferential transformations) on the outer peripheral surface of the cylindrical vibrator 11 and the roller 4 pressed on the maximum combination transformation point on the outer peripheral surface of the cylindrical vibrator 11 as shown by an arrow P, is subjected to the similar motion to the linear motion i shown in FIG. 9 in the first embodiment described above.

In the second embodiment, the roller 52 is employed as means for pressing the printing sheet 52 on the maximum combination transformation point of the ultrasonic actuator 1. However, as shown, for example, in FIG. 13, a no-rotatable pressing member 54 made of a material having an extremely small frictional coefficient to the print sheet 53 may be employed.

A modification of the ultrasonic actuator 1 used in the apparatus described above as the first and second embodiments of this invention will be explained with reference the FIGS. 14 to 17.

Figure 14:
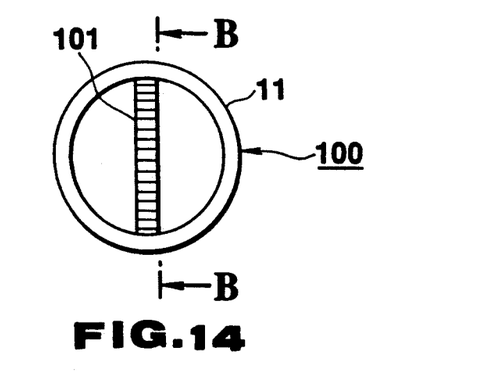
FIG. 14 is a side view schematically showing a modification of the ultrasonic actuator of FIGS. 3A to 3C.
Figure 15:
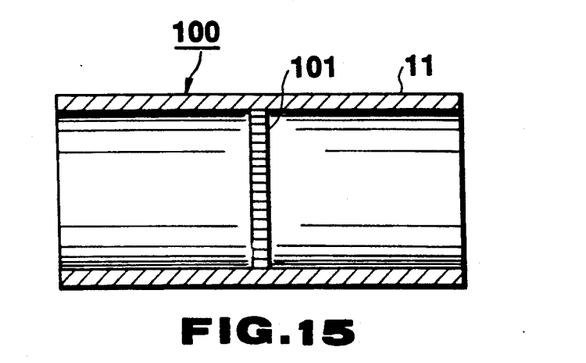
FIG. 15 is a schematic vertical sectional view of the ultrasonic actuator, taken along a line B—B of FIG. 14.

FIGS. 14 and 15 show an ultrasonic actuator 100 which is a first modification of the above described ultrasonic actuator 100.

In this ultrasonic actuator 100, only one piezoelectric actuator 101 having the same construction as those of the piezoelectric actuators 12A, 12B is provided at a position in the neighbor of the longitudinal center on the inner peripheral surface of the cylindrical vibrator 11 so that it extends in the radial direction.

In a case that the longitudinal direction of the ultrasonic actuator 101 of the ultrasonic actuator 100 coincide with the vertical direction, an elastic deformation of an elliptical shape is generated in a cross section of the cylindrical vibrator 11 by applying AC voltage of a predetermined frequency to the piezoelectric actuator 101, as shown in FIGS. 5, and 7a to 7c.

Therefore, the ultrasonic actuator 100 can perform the same transmission of the Kinetic energy as that of the above described ultrasonic actuator 1, as shown in FIGS. 8 and 9.

Figure 16:
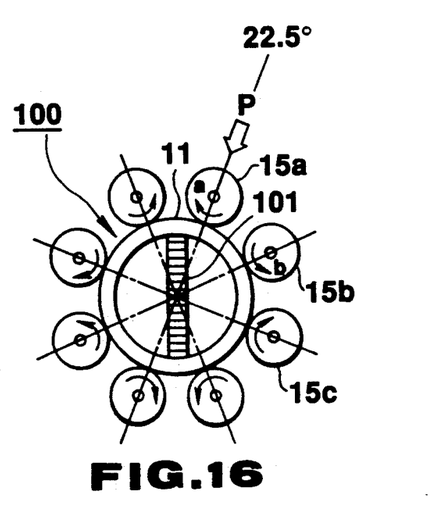
FIG. 16 is a side view schematically showing a structure for converting the movement of the ultrasonic actuator of FIG. 14 into a rotating motion of a rotor.

As shown, for example in FIG. 16, in a case that the longitudinal direction of the above describe piezoelectric actuator 101 coincides with the vertical direction, a plurality of rollers 15a, 15b, 15c, ..., pressed in a direction of an arrow P on positions in the outer peripheral surface of the cylindrical vibrator 11 located at the every angular positions of 45° from the angular position of 22.5°, can be rotated in a direction of an arrow a or b in response to their respective positions.

Figure 17:
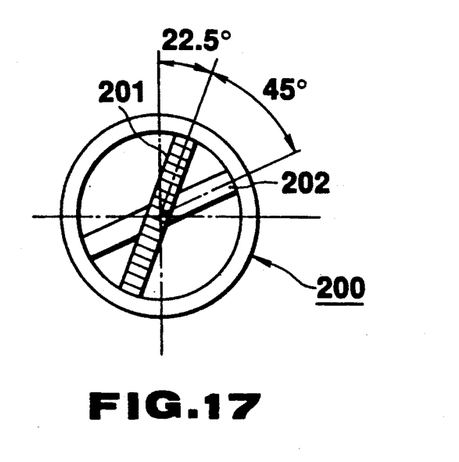
FIG. 17 is a side view schematically showing another modification of the ultrasonic actuator of FIGS. 3A to 3C.

FIG. 17 shows an ultrasonic actuator 200 which is a second modification of the above described ultrasonic actuator 1.

This ultrasonic actuator 200 is constructed by only changing the piezoelectric actuator 12B in the ultrasonic actuator 1 shown in FIGS. 3A to 3C with a bar 22 made of metal.

Even with the construction as described above, the ultrasonic actuator 200 can perform the same operation a that of the above described ultrasonic actuator 1.

By the way, the cross angle of the piezoelectric actuators 12A and 12B or of the piezoelectric actuator 201 and the metal bar 202 in the ultrasonic actuator 1 or 200 shown in FIGS. 3A to 3C or 17 is set at 45°.

However, the cylindrical vibrator 11 can be elastically deformed at its cross section into the elliptic shape even if the cross angle is set at any degrees.

In the ultrasonic actuator 1 shown in FIGS. 3A to 3C, the phase difference of the voltages applied to the piezoelectric actuators 12A, 12B is set at 180°. But, the above described phase difference may be set at any values.

It is noted from our experimentation, that the maximum elastic deformation of the elliptic shape can be generated in the cross section of the cylindrical vibrator 11 of the above described ultrasonic actuator 1 by setting the cross angle of the two piezoelectric actuators 12A, 12B at 45° and also setting the phase difference of the applied voltages at 180°.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A carrier apparatus comprising:
   a cylindrical body having an outer peripheral surface;
   changing means, capable of being extended and contracted, for elastically changing a circular cross section of said cylindrical body into an elliptical cross section;
   control means for controlling the extension and contraction of said changing means so that the changing of the cross section of said cylindrical body to said elliptical shape is caused intermittently; and
   rotation means, located in contact with a predetermined position being on a portion of the outer peripheral surface of said cylindrical body and being not overlapped with major and minor axes of said elliptical cross section, for rotating in response to a displacement of the outer peripheral surface of said cylindrical body, which is caused by changing of the cross section of said cylindrical body to said elliptical shape;
   whereby an object to be carried by said carrier apparatus is carried by rotation of said rotation means.

2. The carrier apparatus according to claim 1, wherein said changing means includes a piezoelectric vibrator, and said control means includes voltage supplying means for supplying a voltage to the piezoelectric vibrator.

3. The carrier apparatus according to claim 1, wherein said cylindrical body is in tubular.

4. The carrier apparatus according to claim 3, wherein said changing means is located so as to extend and contract i the radial direction of the cylindrical body.

5. The carrier apparatus according to claim 4, wherein said changing means includes a piezoelectric vibrator, and said control means includes voltage supplying mean for supplying a voltage to the piezoelectric vibrator.

6. The carrier apparatus according to claim 4, wherein said changing means includes a plurality of piezoelectric vibrators.

7. The carrier apparatus according to claim 4, wherein said changing means includes two piezoelectric vibrators arranged so that a direction in which one of the vibrators extends and contracts crosses at an angle of 45° to a direction in which the other extends and contracts.

8. The carrier apparatus according to claim 4, wherein said changing means is located substantially at the center of said cylindrical body in the axial direction thereof.

9. The carrier apparatus according to claim 1, wherein said rotation means includes a cylindrical member which is capable of rotating in its circumferential direction, and has a protruding portion located on the inner peripheral surface thereof and extending in a circumferential direction of said cylindrical member to contact the outer peripheral surface of said cylindrical body.

10. The carrier apparatus according to claim 9 further comprising:
    means for pressing the object on the outer peripheral surface of said cylindrical member.

11. The carrier apparatus according to claim 9 further comprising:
    means for producing a force to press said cylindrical body on said rotation means.

12. A carrier apparatus comprising:
    a cylindrical body having an outer peripheral surface;
    changing means, capable of being extended and contracted, for elastically changing the cross section of said cylindrical body to an elliptical shape;
    control means for controlling the extension and contraction of said changing means so that a displacement of the cylindrical body to the elliptical shape is caused intermittently; and
    auxiliary means for pressing an object to be moved on a predetermined position being on a portion of the outer peripheral surface of said cylindrical body and being not overlapped with major and minor axes of said elliptical cross section;
    whereby an object is moved in response to a deformation of the outer peripheral surface of said cylindrical body, which is caused by changing of the cross section of said cylindrical body to the elliptical shape.

13. The carrier apparatus according to claim 12, wherein said changing means includes a piezoelectric vibrator, and said control means includes voltage supplying means for supplying a voltage to the piezoelectric vibrator.

14. The carrier apparatus according to claim 12, wherein said cylindrical body is tubular.

15. The carrier apparatus according to claim 14, wherein said changing means is located so as to extend and contract in the radial direction of the cylindrical body.

16. The carrier apparatus according to claim 15, wherein said changing means includes a piezoelectric vibrator, and said control means includes voltage supplying means for supplying voltage to the piezoelectric vibrator.

17. The carrier apparatus according to claim 15, wherein said changing means includes a plurality of piezoelectric vibrators.

18. The carrier apparatus according to claim 15, wherein said changing means includes two piezoelectric vibrators arranged so that a direction in which one of the vibrators extends and contracts crosses at an angle of 45° to a direction in which the other extends and contracts.

19. The carrier apparatus according to claim 15, wherein said changing means is located substantially at the center of said cylindrical body in the axial direction thereof.

20. The carrier apparatus according to claim 12 further comprising:
    means for producing a force to press said auxiliary means on the outer peripheral surface of said cylindrical body;
    whereby the object to be moved is pressed on the outer peripheral surface of said cylindrical body.

* * * * *